(12) United States Patent
Hu et al.

(10) Patent No.: US 11,334,080 B2
(45) Date of Patent: May 17, 2022

(54) SYSTEMS AND METHODS FOR RAISED FLOOR AUTOMATED SENSOR VEHICLES

(71) Applicant: Taiwan Semiconductor Manufacturing Co., Ltd., Hsinchu (TW)

(72) Inventors: Cheng-Kang Hu, Kaohsiung (TW); Cheng-Hung Chen, Zhubei (TW); Yan-Han Chen, Hsinchu (TW); Feng-Kuang Wu, Hsinchu (TW); Hsu-Shui Liu, Pingjhen (TW); Jiun-Rong Pai, Jhubei (TW); Shou-Wen Kuo, Hsinchu (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 268 days.

(21) Appl. No.: 16/580,977

(22) Filed: Sep. 24, 2019

(65) Prior Publication Data

US 2020/0110415 A1 Apr. 9, 2020

Related U.S. Application Data

(60) Provisional application No. 62/737,436, filed on Sep. 27, 2018.

(51) Int. Cl.
*G05D 1/02* (2020.01)
*G01S 17/931* (2020.01)
*B25J 5/00* (2006.01)
*G05D 1/00* (2006.01)

(52) U.S. Cl.
CPC .......... *G05D 1/0214* (2013.01); *B25J 5/007* (2013.01); *G01S 17/931* (2020.01); *G05D 1/0088* (2013.01); *G05D 2201/0216* (2013.01)

(58) Field of Classification Search
CPC .............. G05D 1/0214; G05D 1/0088; G05D 2201/0216; G01S 17/931; B25J 5/007
See application file for complete search history.

(56) References Cited

U.S. PATENT DOCUMENTS

2010/0000163 A1* 1/2010 Tsai ................. E04F 15/02452
52/126.6

FOREIGN PATENT DOCUMENTS

WO WO-2018208984 A1 * 11/2018 ............. G01S 17/87

* cited by examiner

*Primary Examiner* — Michael D Lang
(74) *Attorney, Agent, or Firm* — Duane Morris LLP

(57) ABSTRACT

In an embodiment a system includes: an automated vehicle configured to traverse a first predetermined path; and a sensor system located on the automated vehicle, the sensor system configured to detect a vertical obstacle along the first predetermined path along one or two floorboards ahead of the automated vehicle, wherein the automated vehicle is configured to traverse a second predetermined path in response to detecting the vertical obstacle.

20 Claims, 10 Drawing Sheets

SYSTEMS AND METHODS FOR RAISED FLOOR AUTOMATED SENSOR VEHICLES

CROSS-REFERENCE TO RELATED APPLICATION

The present application claims priority to U.S. Provisional Patent Application No. 62/737,436, filed on Sep. 27, 2018, which is incorporated by reference herein in its entirety.

BACKGROUND

Automated material handling systems (AMHS) have been widely used in semiconductor fabrication facilities (also termed as FABs) to automatically handle and transport groups or lots of wafers between various processing machines or tools used in chip manufacturing. A typical FAB may include a plurality of process bays including processing tools (e.g., a process tool) and wafer staging equipment.

Each bay may include a wafer stocker, which includes multiple bins for temporarily holding and staging a plurality of wafer carriers during the fabrication process. The wafer carriers may include standard mechanical interface (SMIF) pods which may hold a plurality of wafers, or front opening unified pods (FOUPs) which may hold larger wafers. Stockers generally include a single mast robotic lift or crane having a weight bearing capacity sufficient for lifting, inserting, and retrieving a single wafer carrier at one time from the bins. The stocker holds multiple SMIF pods or FOUPs in preparation for transporting a SMIF or FOUP to the loadport of a processing tool.

A semiconductor FAB may include numerous types of automated and manual vehicles for moving and transporting wafer carriers throughout the FAB during the manufacturing process. These may include for example manually moved carts, rail guided vehicles (RGVs), overhead shuttles (OHSs), and overhead hoist transports (OHTs). In an AMHS, an OHT system automatically moves OHT vehicles that carry and transport wafer carriers, such as SMIF pods or FOUPs holding multiple wafers, from a processing or metrology tool (e.g., process tool) or a stocker to the loadport of another tool or other apparatus in the FAB. The OHT system may be used to transport vehicles within each bay (intra-bay) or between bays (inter-bay). The OHT system also moves empty vehicles (i.e. without a wafer carrier) to the tool loadport or other apparatus for receiving and removing empty or full SMIF pods or FOUPs that may contain wafers for further transport and/or processing in other tools.

Handling and transport of wafers in an AMHS is typically built into a FAB and may not be easily adapted when processing machines or tools used in chip manufacturing are moved or changed in a FAB. However, typical manual handling and transportation of wafers also requires large overhead and is prone to human failure. Accordingly, an improved system and method for handling wafer transport in a semiconductor FAB is desired.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1:
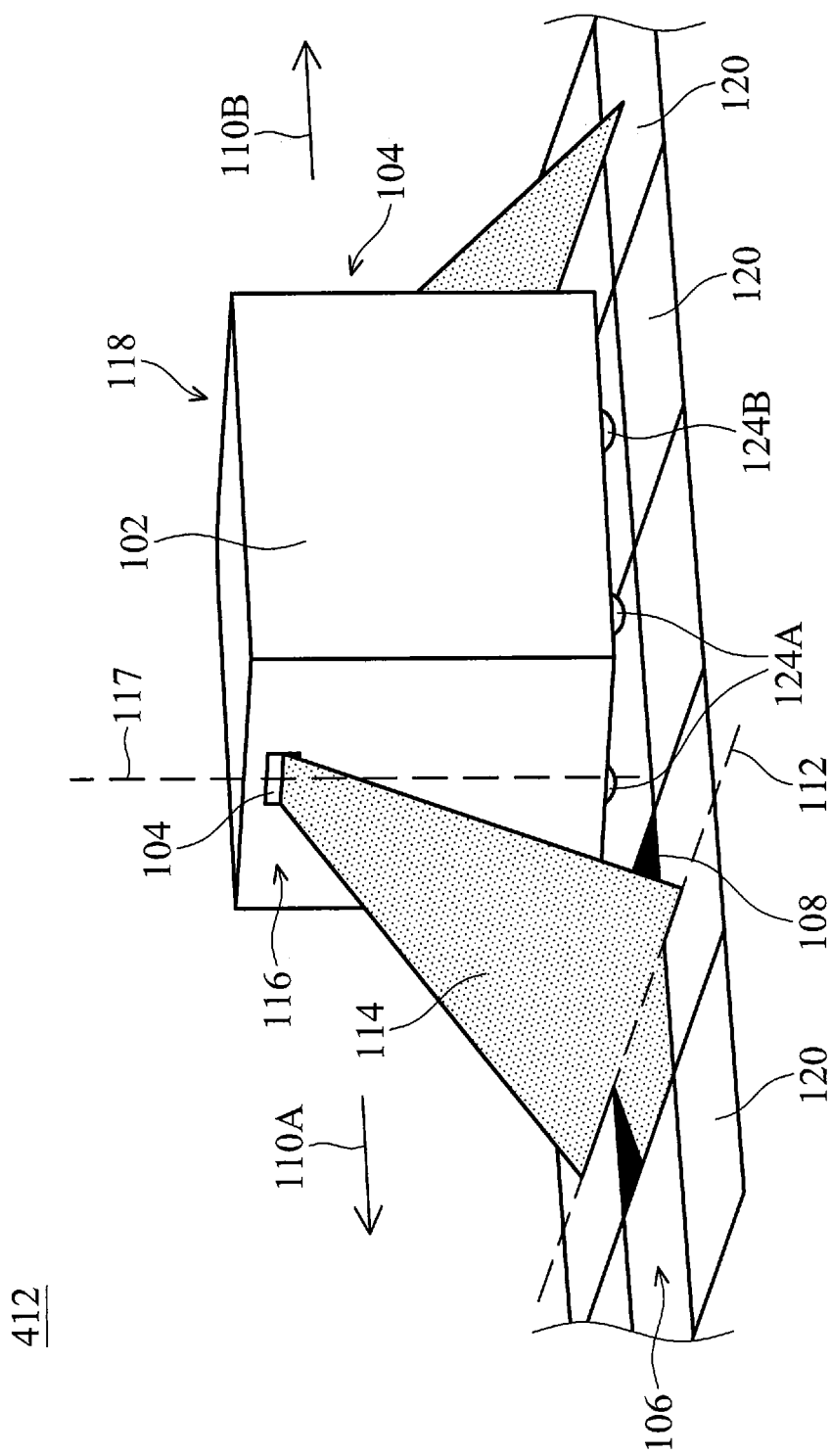
FIG. 1 is a conceptual illustration of an automated sensor vehicle, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Systems and methods in accordance with various embodiments are directed to an automated sensor vehicle as an automated guided vehicle with a depth sensor. The depth sensor may be configured to detect a vertical obstacle (e.g., an inconsistency or abnormality relative to a nominally flat and consistent surface of a raised floorboard platform) based on variations in depth ahead of the automated sensor vehicle. This vertical obstacle may be, for example, an opening along a set of raised floorboard on which the automated sensor vehicle is traversing or an object on the raised floorboard platform on which the automated sensor vehicle is traversing. The depth sensor may detect this vertical obstacle as a variation in depth along a horizontal line in front of the automated sensor vehicle.

In certain embodiments, the depth sensor may be a laser sensor. More specifically, the depth sensor may be, for example, a light detection and ranging (LiDAR) sensor or other laser scanner. Such a laser scanner may be configured to emit pulsed laser light to illuminate a surface (e.g., a ground or a platform of raised floorboards). Differences between returned reflected pulses and the outbound illuminating pulses in terms of return times and wavelengths may be utilized to determine a distance from the surface. In certain embodiments, this depth sensor may be configured to determine a vertical obstacle along a one dimensional line across the surface via a two dimensional depth sensor (e.g., a two dimensional LiDAR or laser scanner). This two dimensional depth sensor may determine vertical abnormalities along a line (e.g., a one dimensional space with length, as opposed to a two dimensional space with length and a width) across the surface. The two dimensional depth sensor may contrast with other embodiments that utilize a one dimensional depth sensor that may determine a vertical obstacle from reflections from a point on a surface (e.g., a point at a relative position away from the depth sensor over time) or yet other embodiments that utilizes a three dimensional depth sensor that may determine a vertical obstacle across an area of a surface (e.g., a two dimensional area with length and width, as opposed to only a length). Advantageously, the variation in depth along a horizontal line (e.g., a one dimensional space) in front of the automated sensor vehicle and across a surface that the automated sensor vehicle is traversing may be more detectible (e.g., produce more pronounced and differentiable sensor data) and require less processing than variations in depth across an area (e.g., a two dimensional area) in front of the automated sensor vehicle and across a surface that the automated sensor vehicle is traversing.

In particular embodiments, the depth sensor may include a linear laser that is tilted at an angle of about 30 degrees to about 50 degrees from a surface of the automated sensor vehicle. In further embodiments, the depth sensor may include a linear laser that is tilted at an angle of about 30 degrees to about 50 degrees from a line orthogonal to a surface of a raised floorboard platform (e.g., the set of raised floorboards that the automated sensor vehicle is traversing). In further embodiments, the linear laser may be at about 700 millimeters or from about 100 millimeters to about 1000 millimeters above the raised floorboard platform. In particular embodiments, the depth sensor may be configured to detect a vertical obstacle one or two floorboards ahead of the automated vehicle. Also, the linear laser may define a horizontal line that extends along an axis orthogonal to a direction of motion (e.g., forward motion) of the automated sensor vehicle.

The automated sensor vehicle may be configured to traverse a raised floorboard platform along a predetermined route. The predetermined route may be, for example, between two different wafer stores (e.g., between two different semiconductor processing stations or tools). Accordingly, the automated sensor vehicle may ferry semiconductor workpieces from wafer store (e.g., one semiconductor processing station) to another wafer store (e.g., another semiconductor processing station). In certain embodiments, a robotic arm or payload area for transported objects (e.g., semiconductor workpieces such as dies or wafers or wafer carriers containing such semiconductor workpieces) may be located on top of the automated sensor vehicle. In particular embodiments, the automated sensor vehicle is configured to move across the raised floorboard platform at about 0.8 meters per second or from about 0.5 meters per second to about 1 meters per second. The constituent raised floorboards of the raised floorboard platform may be porous and/or at a set distance above an underlying floor.

As noted above, the semiconductor processing stations and the automated sensor vehicle may be supported on a raised floorboard platform (e.g., a set or platform of raised floorboards). These floorboards may be in, for example, a rectangular, triangular, octagonal, or other geometric shape. This raised floorboard platform may be configured to, for example, reduce vibrations from one side of the raised floorboard platform (e.g., a lower surface facing the ground) from passing through to a second side of the raised floorboard platform (e.g., the upper surface facing the automated sensor vehicle or semiconductor processing stations).

In certain embodiments, one or more of the individual floorboard pieces (e.g., constituent floorboards) may be removed from the raised floorboard platform, thereby presenting a depth or vertical obstacle along the raised floorboard platform. The automated sensor vehicle, by employing the depth sensor, may avoid areas with these vertical obstacles (e.g., vertical inconsistencies when compared to a nominal surface of the raised floorboard platform) by detecting them ahead of the automated sensor vehicle and redirecting the path (e.g., course) of the automated sensor vehicle to avoid the vertical inconsistencies. In particular embodiments, the automated sensor vehicle may be configured to immediately stop in response to a vertical obstacle detected ahead of the automated sensor vehicle (e.g., ahead of the automated sensor vehicle along a direction that the automated sensor vehicle is moving).

FIG. 1 is a conceptual illustration 100 of an automated sensor vehicle 102, in accordance with some embodiments. The automated sensor vehicle 102 may be an automated guided vehicle with at least one depth sensor 104. The automated sensor vehicle 102 may be configured to traverse a raised floorboard platform 106. The automated sensor vehicle 102 may utilize the depth sensor 104 in order to detect a vertical obstacle 108, such as a missing floorboard or other hole or opening, along the raised floorboard platform 106 atop which the automated sensor vehicle 102 is traversing. The automated sensor vehicle 102 may then redirect its path across the raised floorboard platform 106 to avoid the vertical obstacle 108.

The automated sensor vehicle 102 may be configured to move in a forward direction (illustrated with arrow 110A). The depth sensor 104 may detect the vertical obstacle 108 as a variation in depth along a horizontal line 112 (illustrated as a dotted line) in front of the automated sensor vehicle 102 (e.g., in front along the forward direction indicated by the arrow 110A) and across the raised floorboard platform 106 that the automated sensor vehicle 102 is traversing.

In certain embodiments, the depth sensor 104 may be a laser sensor. More specifically, the depth sensor may be, for example, a light detection and ranging (LiDAR) sensor or other laser scanner, which is configured to illuminate a target or surface (e.g., a ground or a platform of raised floorboards) with a pulsed laser light and to measure the reflected pulses. Differences between the returned reflected pulses and outbound illuminating pulses in terms of the return times and wavelengths may be utilized to determine a distance from the surface. In certain embodiments, this depth sensor 104 may be configured to determine the vertical obstacle 108 along the one dimensional horizontal line 112 across the raised floorboard platform 106 via a two dimensional depth sensor (e.g., a two dimensional LiDAR or laser scanner) with a two dimensional field of view 114. Accordingly, the two dimensional field of view 114 would terminate at the raised floorboard platform 106 and form the horizontal line 112 should the raised floorboard platform 106 be vertically consistent (e.g., without a missing panel or other opening along the raised floorboard platform 106). However, the two dimensional field of view 114 would determine a vertical inconstancy along the horizontal line 112 should the raised floorboard platform 106 be vertically inconsistent (e.g., with a missing panel or other opening along the raised floorboard platform 106. Advantageously, the variation in depth along the horizontal line 112 (e.g., a one dimensional area) in front of the automated sensor vehicle 102 and across a surface that the automated sensor vehicle is traversing (e.g., the raised floorboard platform 106) may be more detectible (e.g., produce more pronounced and differentiable sensor data) and require less processing than variations in depth across an area (e.g., a two dimensional area) in front of the automated sensor vehicle and across the surface (e.g., the raised floorboard platform 106) that the automated sensor vehicle 102 is traversing.

In particular embodiments, the field of view 114 of the depth sensor 104 may be at an angle of about 30 degrees to about 50 degrees from a surface 116 of the automated sensor vehicle 102. In particular embodiments, the field of view 114 of the depth sensor 104 may be at an angle of about 30 degrees to about 50 degrees from a virtual line 117 (illustrated as a dotted line) orthogonal to the raised floorboard platform 106. In further embodiments, the field of view 114 of the depth sensor 104 may be at about 700 millimeters or from about 100 millimeters to about 1000 millimeters above the raised floorboard platform 106. In certain embodiments, the depth sensor 104 may be implemented as a linear or line laser which projects outbound illuminating pulses that may illuminate the raised floorboard platform 106 along the horizontal line 112. In particular embodiments, the depth sensor may be configured to detect a vertical obstacle one or two floorboards ahead of the automated vehicle. In other embodiments, the depth sensor 104 may be implemented as a point laser configured to constantly scan (e.g., move or swivel across) the field of view 114.

The automated sensor vehicle 102 may be configured to traverse the raised floorboard platform 106 along a predetermined route. The predetermined route may be, for example, between wafer stores (e.g., two different semiconductor processing stations or tools). In certain embodiments, this predetermined route may be an end to end route, such that every motion along the predetermined route is also predetermined. In other embodiments, this predetermined route may be a current direction of motion and not an end to end route with every motion along the predetermined route also predetermined. For example, the current direction of motion may be along the forward direction (illustrated with arrow 110A).

Accordingly, the automated sensor vehicle 102 may ferry semiconductor workpieces from wafer store to another (e.g., from one semiconductor processing station to another semiconductor processing station). In certain embodiments, a payload area 118 on top of the automated sensor vehicle may include a robotic arm or contain transported objects (e.g., a wafer carrier holding semiconductor workpieces such as dies or wafers). In particular embodiments, the automated sensor vehicle is configured to move across the raised floorboard platform 106 at about 0.8 meters per second or from about 0.5 meters per second to about 1 meters per second.

In particular embodiments, the individual floorboards of the raised floorboard platform 106 may be porous and/or at a set distance above an underlying floor. These individual floorboards of the raised floorboard platform 106 may be in, for example, a rectangular, triangular, octagonal, or other geometric shape. This raised floorboard platform 106 may be configured to, for example, reduce vibrations from one side of the raised floorboard platform 106 (e.g., a lower surface facing the ground) from passing through to a second side of the raised floorboard platform 106 (e.g., the upper surface facing the automated sensor vehicle 102).

In particular embodiments, the automated sensor vehicle 102 may include multiple depth sensors 104. For example, the automated sensor vehicle 102 may include a depth sensor 104 at a front (e.g., facing the forward direction illustrated with arrow 110A, or that is illustrated as closest to the vertical obstacle 108). The depth sensor 104 at the front (e.g., facing in the direction of the arrow 110A) may be configured to detect the vertical obstacle 108 in the forward direction illustrated with arrow 110A. Similarly, the automated sensor vehicle 102 may include a depth sensor 104 at a back (e.g., facing the reverse direction illustrated with arrow 110B). The depth sensor 104 at the back facing the direction of the arrow 110B may be configured to detect a vertical obstacle in the reverse direction illustrated with arrow 110B. The features of the depth sensor at the back may be similar or the same as that of the depth sensor at the front, except for facing a different direction, and will not be repeated herein for brevity.

In particular embodiments, the automated sensor vehicle 102 may include front wheels 124A configured to guide or turn the automated sensor vehicle as it moves. The automated sensor vehicle 102 may also include back wheels 124B (only one is illustrated due to limitations of the perspective conceptual illustration 100) that are configured to rotate but not turn the automated sensor vehicle as it moves. These wheels 124A, 124B may be configured to move the automated sensor vehicle 102 via the rotational motion of the wheels 124A, 124B. Accordingly, the automated sensor vehicle 102 may be configured to move in a forward or reverse direction as guided by the two front wheels 124A. In other embodiments, all wheels may be configured to guide or turn the automated sensor vehicle as it moves via the rotational motion of the wheels.

In certain embodiments, one or more of the individual floorboard pieces 120 may be removed from the raised floorboard platform 106, thereby presenting the vertical obstacle 108 (e.g., an opening, hole, or depth) along the raised floorboard platform 106. The automated sensor vehicle 102, by employing the depth sensor 104, may avoid areas with these vertical obstacles 108 by detecting them ahead of the automated sensor vehicle 102 and redirecting the path of the automated sensor vehicle 102 to avoid the vertical obstacle 108. In particular embodiments, the automated sensor vehicle 102 may be configured to immediately stop in response to the vertical obstacle 108 detected ahead of the automated sensor vehicle 102 (e.g., ahead of the automated sensor vehicle 102 along a direction that the automated sensor vehicle 102 is moving).

Figure 2:
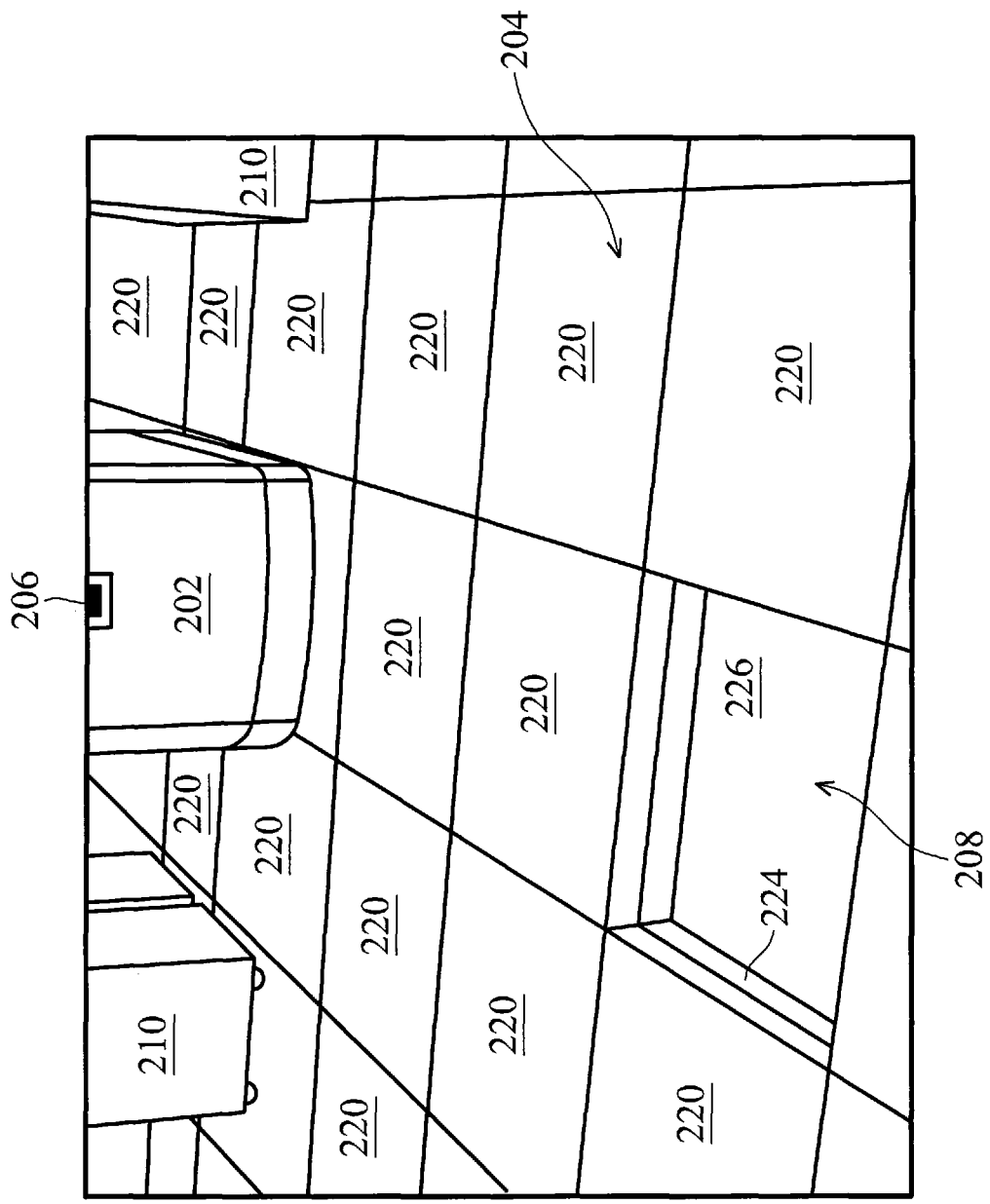
FIG. 2 is an illustration of an automated sensor vehicle on a raised floorboard platform, in accordance with some embodiments.

FIG. 2 is an illustration 200 of an automated sensor vehicle 202 on a raised floorboard platform 204, in accordance with some embodiments. As noted above, the automated sensor vehicle 202 may be an automated guided vehicle with at least one depth sensor 206. The automated sensor vehicle 202 may be configured to traverse the raised floorboard platform 204. The automated sensor vehicle 202 may utilize the depth sensor 206 in order to detect a vertical obstacle 208, such as a missing floorboard or other hole or opening, along the raised floorboard platform 204 atop which the automated sensor vehicle 202 is traversing. The automated sensor vehicle 202 may then redirect its path across the raised floorboard platform 204 to avoid the vertical obstacle 208.

In various embodiments, the automated sensor vehicle 202 may utilize other sensors (not illustrated) to be guided for avoidance of other objects 210 on the raised floorboard platform 204. For example, the automated sensor vehicle 202 may include an image sensor, LiDAR sensor, magnetic sensor, or other type of sensor to detect the other objects 210 so that they may be avoided during traversal of the raised floorboard platform 204. In particular embodiments, the location of the other objects 210 may be predetermined or communicated to the automated sensor vehicle 202 so that the automated sensor vehicle 202 may plot a path traversing the raised floorboard platform 204 that avoids the predetermined locations of the other objects 210.

As illustrated, the vertical obstacle 208 may be due to a missing or otherwise removed individual floorboard piece 220 not present or removed from the raised floorboard platform 204. Also, as will be discussed further below, the raised floorboard platform 204 may include structure on which the individual floorboard pieces 220 rest on and are physically separated from a ground 226 underneath the raised floorboard platform 204.

In various embodiments, the raised floorboard platform may be implemented in a semiconductor fabrication facility (FAB) due to more stringent requirements in the fabrication environment and contamination control. For example, when the feature size was in the 2 micrometer (μm) range, a cleanliness class of 100˜1000 (e.g., the number of particles at sizes larger than 0.5 μm per cubic foot) was sufficient. However, when the feature size is reduced to 0.25 μm, a cleanliness class of 0.1 is required. It has been recognized that an inert mini-environment may be a solution to future fabrication technologies when device size is reduced further. In order to eliminate micro-contamination and to reduce native oxide growth on silicon surfaces, the wafer processing and the loading/unloading procedures at a semiconductor fabrication facility (FAB) may be enclosed in an extremely high cleanliness mini-environment that is constantly flushed with ultra-pure nitrogen that contains no oxygen and moisture.

Figure 3A:
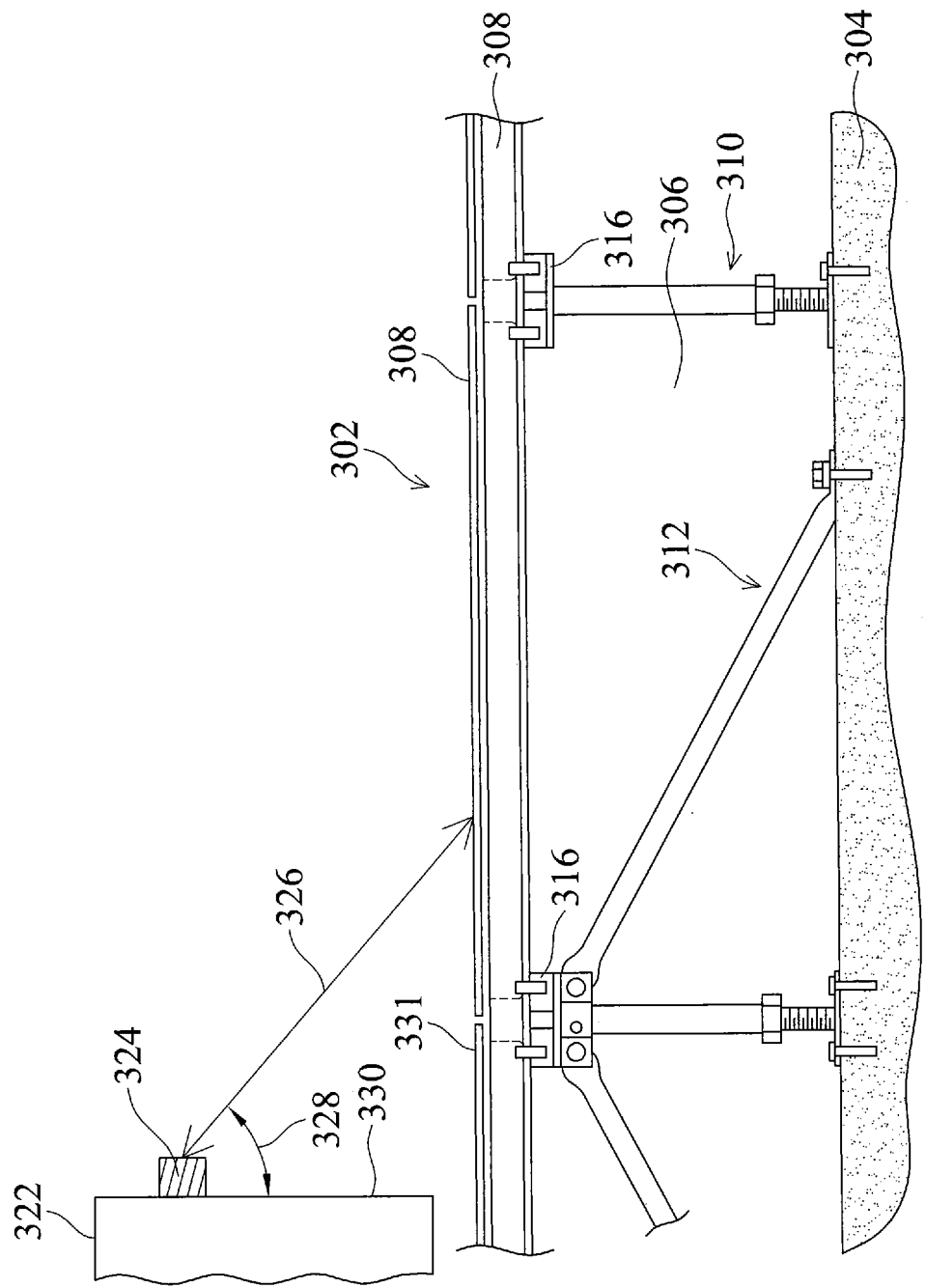
FIG. 3A is a side view diagram of a raised floorboard platform, in accordance with some embodiments.

Accordingly, one design in modern clean room facilities is the implementation of the raised floorboard platform. FIG. 3A is a side view diagram of a raised floorboard platform 302, in accordance with some embodiments. In certain embodiments, the raised floorboard platform 302 is installed between about 45 centimeters (cm) to about 60 cm above a ground 304 (e.g., a finished concrete waffle slab). The raised floorboard platform 302 in general, covers the entire clean room production area. In certain embodiments, a grid 306 (e.g., a region within which an individual floorboard piece 308 or tile sits) of the raised floorboard platform 302 may be based on a 60×60 centimeter (cm) system and may be aligned with the center lines of a conventional ceiling grid. Some of the individual floorboard pieces 308 are perforated for circulating the clean room air. The adjustment of the air pressure in the clean room and the balancing of air flow can be achieved by selecting individual floorboard pieces 308 with proper perforations.

In the raised floorboard platform 302 shown in FIG. 3A, the individual floorboard piece 308 may be static-dissipative and made of non-combustible material that is also chemical abrasion resistive. For example, the individual floorboard piece 308 may be made of vinyl which is impact resistant and meets the electrostatic discharge isolation resistance requirement for a clean room environment.

In various embodiments, the raised floorboard platform 302 may be laterally stable in all directions with or without the presence of the individual floorboard piece 308. This may be achieved by anchoring pedestals 310 into the ground 304 (e.g., concrete floor slab or other surface) and by the further use of steel braces 312. The individual floorboard pieces 308 are supported by the steel braces 312 which are in turn supported at each corner by adjustable height pedestals 310. As shown in FIG. 3A, the anchoring pedestals 310 are bolted to the ground 304 (e.g., concrete floor slab or other surface). An insulation plate 316 may be placed on top of each pedestal 310 to attenuate foot step sound and better provide electrical isolation. The steel braces 312 are used to further increase the rigidity of the raised floorboard platform 302 and the pedestal 310 support.

In various embodiments, an automated sensor vehicle 322 may be configured to traverse the set of raised floorboard platform 302. The automated sensor vehicle 322 may utilize a depth sensor 324 in order to detect a vertical obstacle, such as a missing floorboard or other hole or opening, along the raised floorboard platform 302 atop which the automated sensor vehicle 322 is traversing. The automated sensor vehicle 322 may then redirect its path across the raised floorboard platform 302 to avoid the vertical obstacle.

As noted above, the depth sensor 324 may be a laser sensor in certain embodiments. More specifically, the depth sensor 324 may be, for example, a light detection and ranging (LiDAR) sensor or other laser scanner, which is configured to illuminate a target or surface (e.g., a ground or a raised floorboard platform) with a pulsed laser light and to measure the reflected pulses. Differences between the returned reflected pulses and outbound illuminating pulses in terms of the return times and wavelengths may be utilized to determine a distance from the surface. In certain embodiments, this depth sensor 324 may be configured to determine a vertical obstacle along a one dimensional horizontal line across a surface (e.g., the raised floorboard platform 302) via a two dimensional depth sensor (e.g., a two dimensional LiDAR or laser scanner) with a two dimensional field of view 326. Accordingly, the two dimensional field of view 326 would terminate at the surface (e.g., the raised floorboard platform 302) and form the horizontal line should the surface (e.g., the raised floorboard platform 302) be vertically consistent (e.g., without a missing panel or other opening along the raised floorboard platform 302). However, the two dimensional field of view 326 would determine a vertical inconstancy along the horizontal line should the surface (e.g., the raised floorboard platform 302) be vertically inconsistent (e.g., with a missing panel or other opening along the raised floorboard platform 302).

In particular embodiments, the field of view 326 at the depth sensor 324 may be at an angle 328 of about 30 degrees to about 50 degrees from a surface 330 of the automated sensor vehicle 332. In certain embodiments, this surface 330 may also be substantially orthogonal to an upward facing surface 331 of the raised floorboard platform 302. In further embodiments, the field of view 326 of the depth sensor 324 may be at about 700 millimeters or from about 100 millimeters to about 1000 millimeters above the raised floorboard platform 106. In certain embodiments, the depth sensor 324 may be implemented as a linear or line laser which projects outbound illuminating pulses that may illuminate along the horizontal line.

Figure 3B:
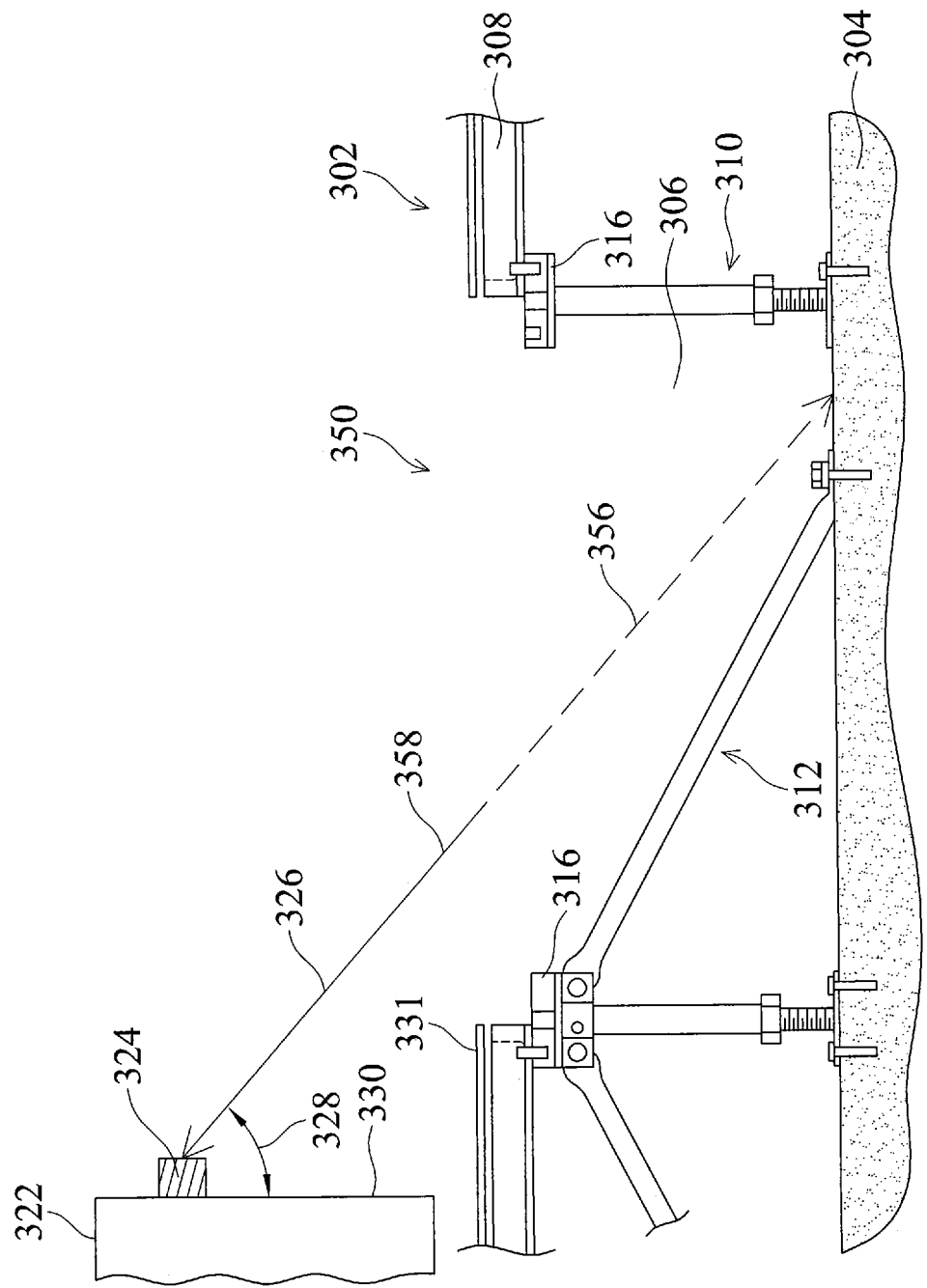
FIG. 3B is a side view diagram of the raised floorboard platform with a vertical obstacle, in accordance with some embodiments.

FIG. 3B is a side view diagram of the raised floorboard platform 302 with a vertical obstacle 350, in accordance with some embodiments. As illustrated, the vertical obstacle 350 may be an opening due to a missing or otherwise removed individual floorboard piece 308 not present or removed from the raised floorboard platform 302. This vertical obstacle 350 may be within a grid 306 (e.g., a region within which an individual floorboard piece 308 or tile is configured to sit) of the raised floorboard platform 302 may be based on a 60×60 centimeter (cm) system and/or may be aligned with the center lines of a conventional filter ceiling grid. Accordingly, the vertical obstacle of FIG. 3B may be detected as a first depth 356 (illustrated with a dotted line) from the depth sensor 324 to the ground 304 (e.g., concrete floor slab or other surface) within a field of view of the depth sensor 324 that is greater than a second depth 358 (illustrated with a solid line) from the depth sensor 324 to an individual floorboard piece 308 of the raised floorboard platform 302 within a field of view of the depth sensor 324.

Figure 3C:
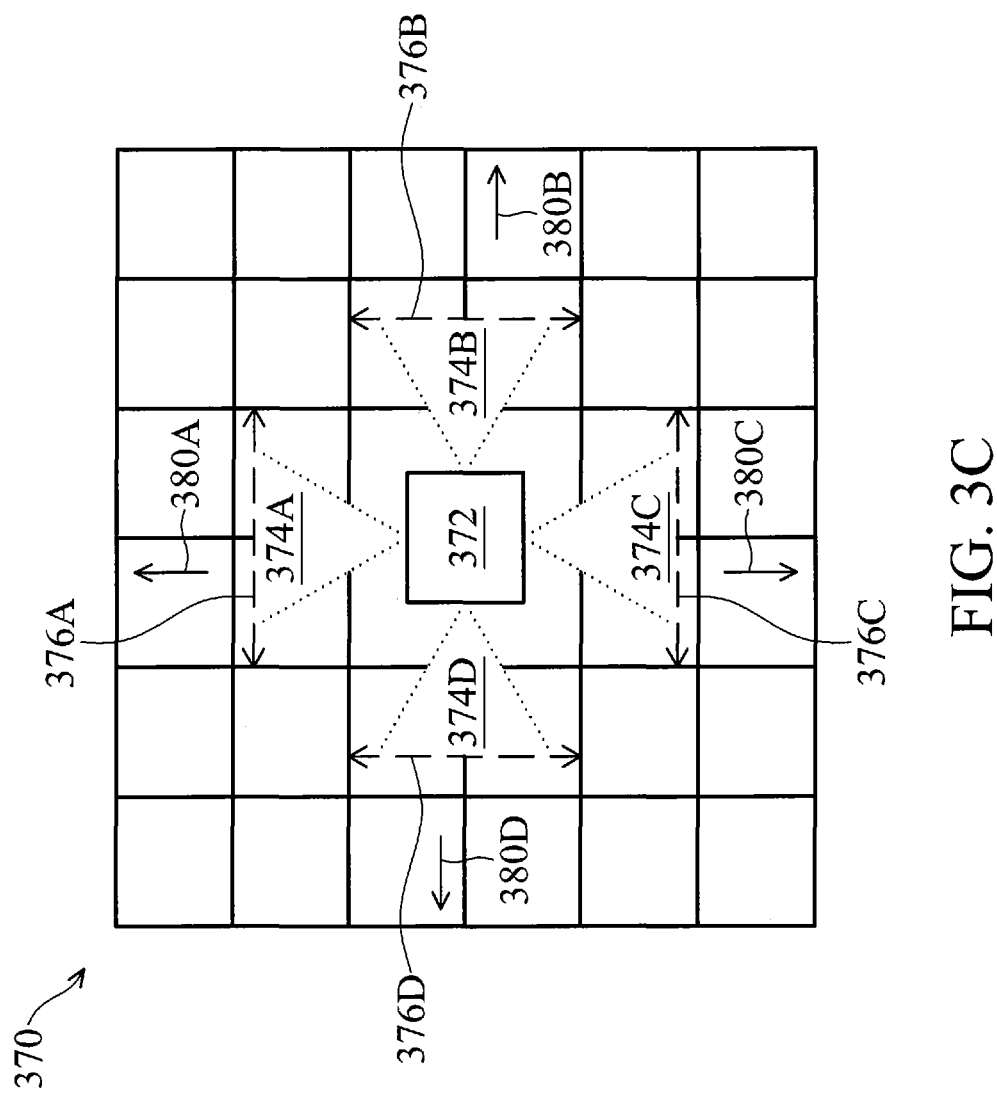
FIG. 3C is a top plan view of part of a raised floorboard platform being traversed by an automated sensor vehicle, in accordance with some embodiments.

FIG. 3C is a top plan view of part of a raised floorboard platform 370 being traversed by an automated sensor vehicle 372, in accordance with some embodiments. The automated sensor vehicle 372 may include multiple sensors, each with a respective two dimensional field of views 374A, 374B, 374C, 374D. Each of the respective two dimensional field of views 374A, 374B, 374C, 374D terminate at one end at respective sensors of the automated sensor vehicle 372. Also, the two dimensional field of views 374A, 374B, 374C, 374D would terminate at the surface (e.g., the raised floorboards 370) along respective horizontal lines 376A, 376B, 376C, 376D should the surface (e.g., the raised floorboard platform 370) be vertically consistent (e.g., without a missing panel or other opening along the raised floorboard platform 370). Stated another way, in certain embodiments the sensors may include a line laser that emit a laser light in a visible light spectrum that would illuminate a line along the respective horizontal lines 376A, 376B, 376C, 376D.

In particular embodiments, the automated sensor vehicle 372 may include multiple depth sensors but only utilize (e.g., have activated) one of the multiple depth sensors at a time. For example, only a depth sensor facing a forward direction of motion may be utilized or activated at a particular point of time. This forward motion may change as the automated sensor vehicle 372 moves, such as where the automated sensor vehicle 372 may move forward in a first direction 380A and thus only utilize a depth sensor with a first two dimensional field of view 374A. Alternatively, the automated sensor vehicle 372 may move forward in a second direction 380B and thus only utilize a depth sensor with a second two dimensional field of view 374B. Alternatively, the automated sensor vehicle 372 may move forward in a third direction 380C and thus only utilize a depth sensor with a third two dimensional field of view 374C. Alternatively, the automated sensor vehicle 372 may move forward in a fourth direction 380D and thus only utilize a depth sensor with a fourth two dimensional field of view 374D. In alternative embodiments, the automated sensor vehicle may move in a particular direction but have more than one (e.g., be monitoring more than one two dimensional fields of view 374A, 374B, 374C, 374D) or even all of its depth sensors active (e.g., be monitoring all two dimensional fields of view 374A, 374B, 374C, 374D).

Figure 4A:
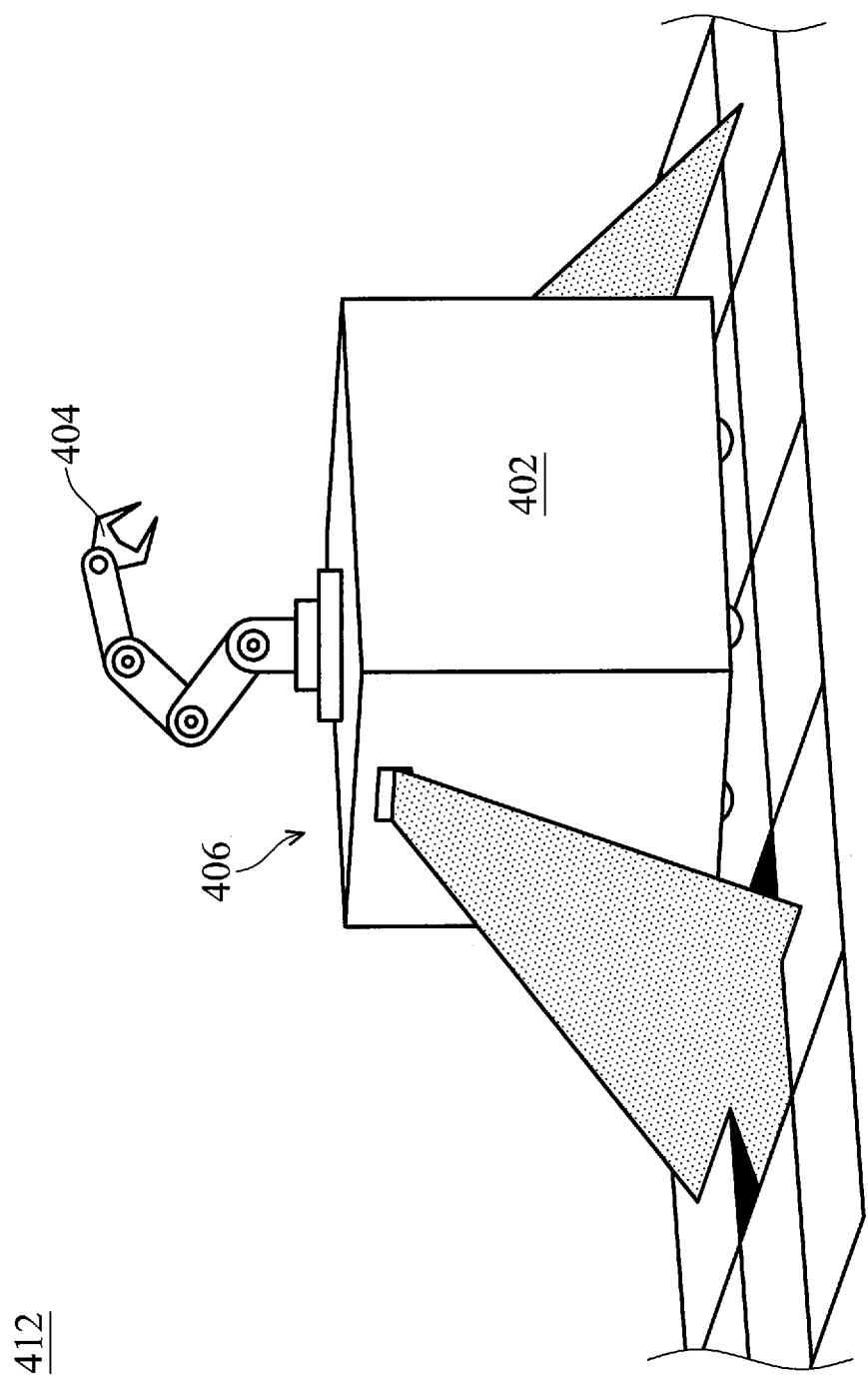
FIG. 4A is a conceptual illustration of an automated sensor vehicle with a robotic arm, in accordance with some embodiments.
Figure 4B:
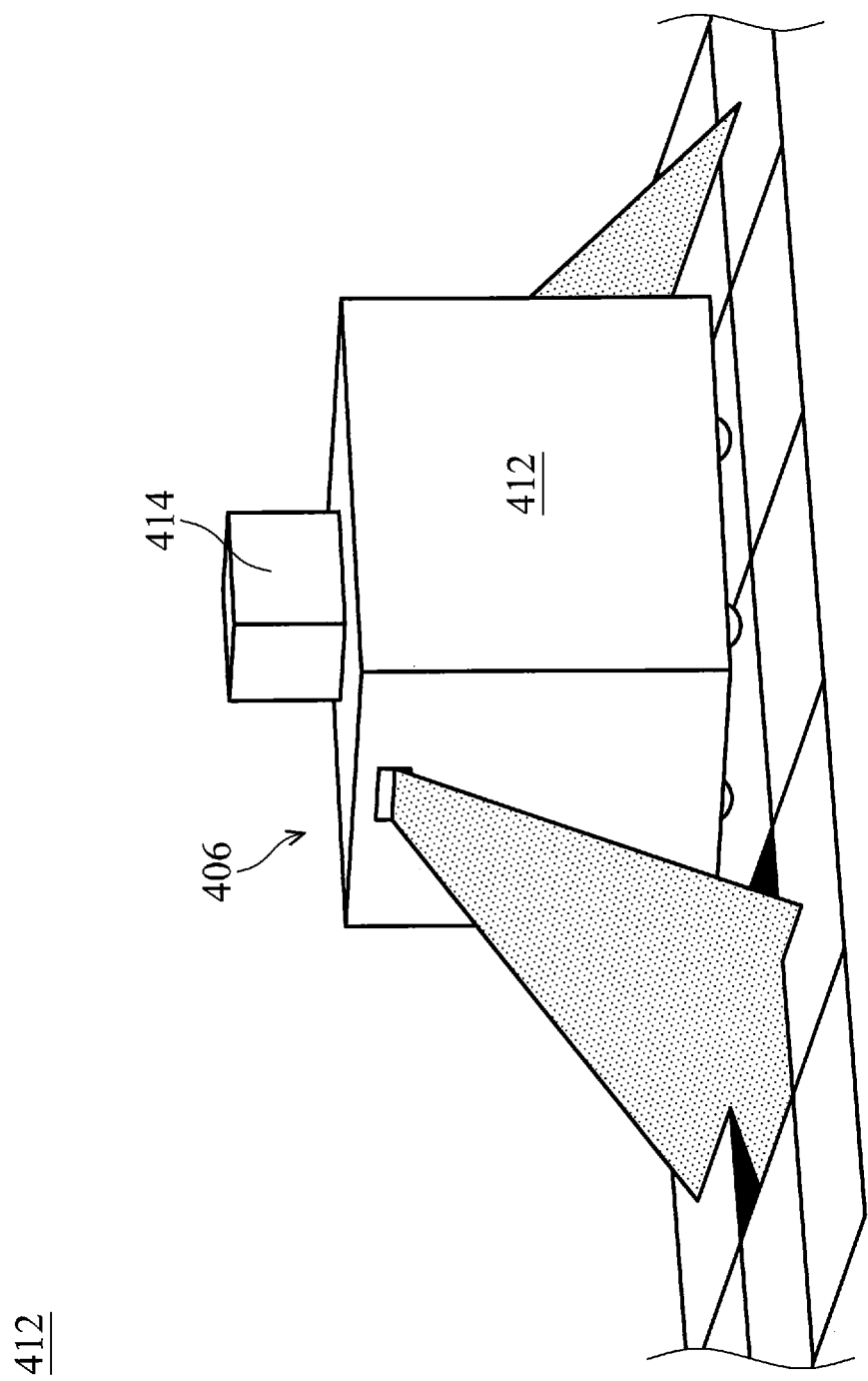
FIG. 4B is a conceptual illustration of an automated sensor vehicle with a wafer carriers, in accordance with some embodiments.

FIG. 4A is a conceptual illustration 400 of an automated sensor vehicle 402 with a robotic arm 404, in accordance with some embodiments. The robotic arm 404 may be on a payload area 406 on top of the automated sensor vehicle 402. In certain embodiments, the automated sensor vehicle 402 with a robotic arm 404 may be referred to as a first type of automated sensor vehicle FIG. 4B is a conceptual illustration 410 of an automated sensor vehicle 412 with a wafer carriers 414, in accordance with some embodiments. The wafer carrier 414 may be on a payload area 416 on top of the automated sensor vehicle 412. The wafer carrier 414 may be, for example, a standard mechanical interface (SMIF) pods which may hold a plurality of wafers, or front opening unified pods (FOUPs) which may hold larger wafers. The wafer carrier 414 may also be a die vessel such as a boat or a tray configured to hold multiple dies (e.g., singulated pieces of a wafer). In certain embodiments, the automated sensor vehicle 412 with a wafer carrier 414 may be referred to as a second type of automated sensor vehicle.

Figure 4C:
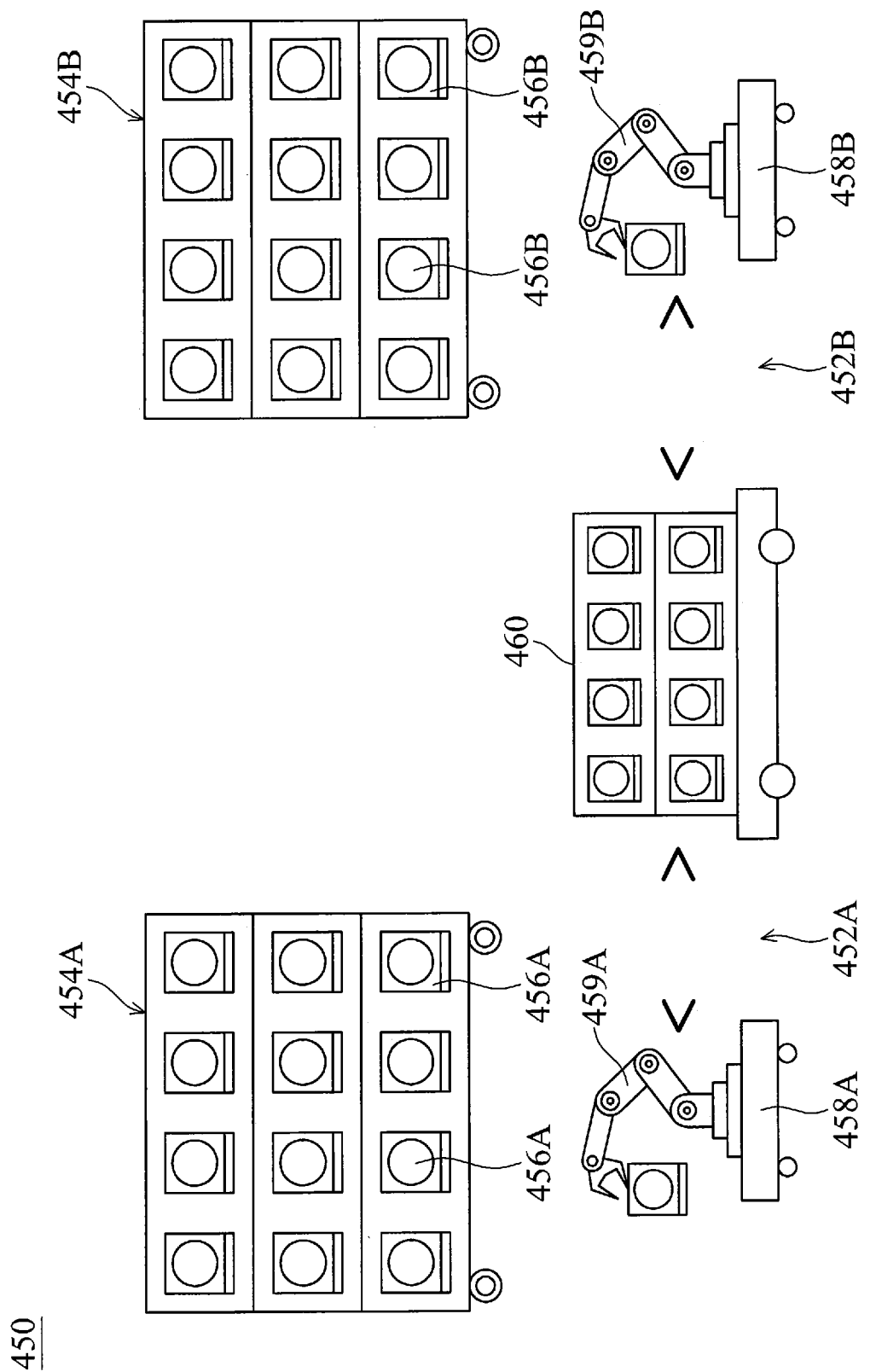
FIG. 4C is a conceptual illustration of an automated wafer handling system, in accordance with some embodiments.

FIG. 4C is a conceptual illustration of an automated wafer handling system 450, in accordance with some embodiments. The automated wafer handling system may be within a clean room or other type of semiconductor fabrication facility that operates using a raised floorboard platform, as discussed above. The automated wafer handling system 450 may include two wafer handling areas 452A and 452B. Each wafer handling area may include a wafer store 454A or 454B, respectively, that is a rack for wafer carriers 456A, 456B respectively. Each wafer carrier may include one, or several, wafers or dies. The automated wafer handling system 450 may include a first type of automated sensor vehicle 458A, 458B next to (e.g., adjacent to) each wafer store 454A, 454B. Each of the first type of automated sensor vehicle 458A, 458B may include a robotic arm 459A, 459B. Additional, the automated wafer handling system 450 may include a second type of automated sensor vehicle 460 that may be configured to transport wafers between the first wafer handling area 452A and the second wafer handling area 452B. Each of the first type of automated sensor vehicle 4558A, 458B and the second type of automated sensor vehicle 460 may include a depth sensor, as described above.

Although the wafer store 454A, 454B is illustrated as a rack, any type of stationary storage or holding of a wafer may be utilized as a wafer store for different applications in accordance with various embodiments. For example, the wafer store may be a platform for passive storage of a wafer, such as a rack, shelf, or a table top on which a wafer carrier may be placed. Alternatively, the wafer store may be a platform for active storage of a wafer, such as a semiconductor processing station or tool or stocker. More specifically when the wafer store 454A, 454B is a semiconductor processing station or tool, the wafer store 454A, 454B may specifically be part of the semiconductor processing station or tool that is the load port where the semiconductor processing station or tool is configured to receive or eject the wafer carrier and the constituent wafers or dies processed by the semiconductor processing station or tool.

The first type of automated sensor vehicle 458A, 458B may include the ability to manipulate and/or handle individual wafers, dies, and/or wafer carriers. For example, the robotic arm 459A, 459B may represent a robotic arm with a gripper or other manner of manipulating or handing a wafer, die, and/or wafer carrier from one platform to another. The term platform may refer to any place on which a wafer may or be stored and/or transported, such as a wafer carrier and/or the second type of automated sensor vehicle 460. The robotic arm 459A, 459B may manipulate and/or handle a wafer, die, and/or wafer carrier in a conventional manner utilizing conventional robotic arm structures and techniques, and thus will not be discussed in detail herein for brevity. For example, the robotic arm 459A, 459B may pick up, move, and put back down a wafer, die, and/or wafer carrier from one platform to another. Additionally, the first type of automated sensor vehicle 458A, 458B may be configured for autonomous movement independent of a rail or other physical guide. For example, the first type of automated sensor vehicle 458A, 458B may include a set of wheels which may move the first type of automated sensor vehicle 458A, 458B with degrees of freedom in a rolling (e.g., rotational) motion.

The second type of automated sensor vehicle 460 may be configured, or constructed, to hold a wafer, die, and/or a wafer carrier. In certain embodiments, the second type of automated sensor vehicle 460 may include a structure for carrying multiple wafers, dies, and/or wafer carriers (e.g., a rack or other structure on which wafers, dies and/or wafer carriers may be securely held during transportation by the second type of automated sensor vehicle 460). The structure for carrying multiple wafers, dies, and/or wafer carriers may include discreetly identifiable locations, such that wafers, dies, and/or wafer carriers located on the autonomous cart may be accorded a location on the second type of automated sensor vehicle 460 and identified accordingly.

Both the first type of automated sensor vehicle 458A, 458B and/or the second type of automated sensor vehicle 460 may be configured to autonomously move between locations within a semiconductor fabrication facility (FAB) on top of a raised floorboard platform. In certain embodiments, the first type of automated sensor vehicle 458A, 458B and/or the second type of automated sensor vehicle 460 may be configured with a pathing module that may configure the first type of automated sensor vehicle 458A, 458B and/or the second type of automated sensor vehicle 460 to determine various paths (e.g., determine various predetermined paths, or paths determined prior to setting out between locations) between different wafer handling areas (e.g., wafer handling areas 452A, 452B) autonomously and without external, manual guidance (e.g., without being driven and/or guided manually by an operator in real time). For example, pathing modules may be configured to receive and execute movement along known paths between different wafer handling areas. As another example, pathing modules may autonomously analyze a semiconductor fabrication facility (e.g., a layout of the semiconductor fabrication facility) to determine different paths between different wafer handling areas to avoid stationary obstacles. Further examples of pathing modules may include modules which may execute pathing or path finding applications, such as an application of Dijkstra's algorithm or an angle path planning algorithm.

Advantageously in certain embodiments, as each of the first type of automated sensor vehicle 458A, 458B and/or the second type of automated sensor vehicle 460 are mobile, they may move about a semiconductor fabrication facility (FAB) on raised floors as desired in an automated fashion without needing to replace rails and/or other transportation fixtures utilized by a more immutable AMHS, such as an AMHS that moves wafer carriers overhead via vehicles suspended from an overhead rail. Furthermore, the first type of automated sensor vehicle 458A, 458B and/or the second type of automated sensor vehicle 460 may include a communications interface to coordinate wafer transport and handling without need for manual intervention, as with traditional systems which relies upon human labor for transportation of wafers and/or wafer carriers around a FAB. In certain embodiments, the automated wafer handling system 450 may be centrally controlled with each individual wafer store, first type of automated sensor vehicle 458A, 458B and/or the second type of automated sensor vehicle 460 configured to operate automatically and without individual instructions. For example, various predetermined routines may be chosen and executed based on simply noting the locations and types of wafer stores that the automated wafer handling system 450 are to transport wafers, dies, and/or wafer carriers between.

Figure 5:
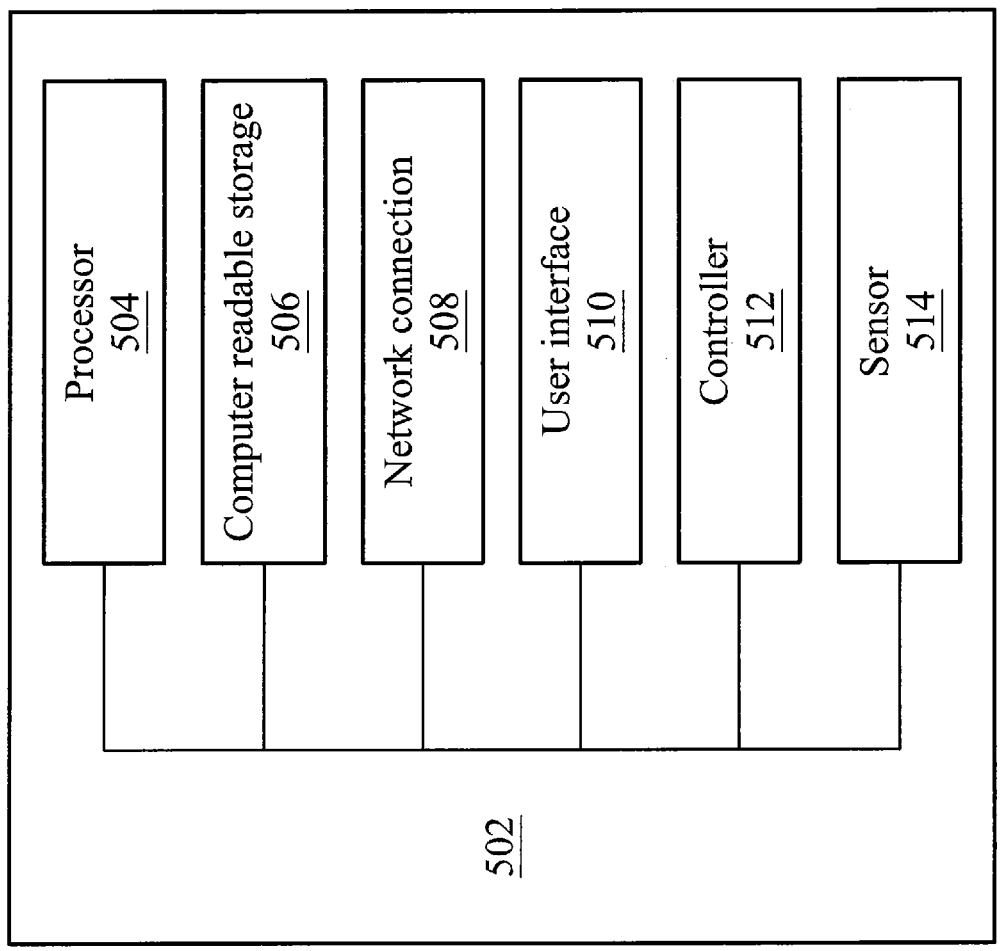
FIG. 5 a block diagram of an active module of an automated sensor vehicle, in accordance with some embodiment.

FIG. 5 a block diagram of an active module 502 of an automated sensor vehicle, in accordance with some embodiment. The active module 502 may include a processor 504. In further embodiments, the processor 504 may be implemented as one or more processors. The processor 504 may be operatively connected to a computer readable storage module 506 (e.g., a memory and/or data store), a network connection module 508, and user interface module 510.

The processor 504 may be configured to control various physical apparatuses to facilitate communication and control of the automated sensor vehicle. For example, the processor 504 may be configured to control movement or functionality for at least one of a wheel, a robotic arm, the network connection module 508, the computer readable storage 506, the user interface module 510, the sensor 514, or any other controllable aspect of an automated sensor vehicle that the active module is part of. For example, the processor 504 may control a motor that may move at least one of a wheel, and/or a robotic arm.

In some embodiments, the computer readable storage module 506 may include automated sensor vehicle logic that may configure the processor 504 to perform the various processes discussed herein. The computer readable storage may also store data, such as any parameter or information that may be utilized to perform the various processes discussed herein.

The network connection module 508 may facilitate a network connection of an automated sensor vehicle with various devices and/or components internal to or external to an automated sensor vehicle. In certain embodiments, the network connection module 508 may facilitate a physical connection, such as a line or a bus. In other embodiments, the network connection module 508 may facilitate a wireless connection, such as over a wireless local area network (WLAN) by using a transmitter, receiver, and/or transceiver. For example, the network connection module 508 may facilitate a wireless or wired connection with other automated sensor vehicles.

The active module 502 may also include the user interface module 510. The user interface module 510 may include any type of interface for input and/or output to an operator of the automated sensor vehicle, including, but not limited to, a monitor, a laptop computer, a tablet, or a mobile device, etc.

The active module 502 may include a sensor. This sensor may be, for example, a depth sensor. In certain embodiments, the depth sensor may be a laser sensor. More specifically, the depth sensor may be, for example, a light detection and ranging (LiDAR) sensor or other laser scanner, which is configured to illuminate a surface (e.g., a ground or a raised floorboard platform) with a pulsed laser light and to measure the reflected pulses. Differences between the returned reflected pulses and outbound illuminating pulses in terms of the return times and wavelengths may be utilized to determine a distance from the surface. In certain embodiments, this depth sensor may be configured to determine a vertical obstacle along a one dimensional line across a surface via a two dimensional depth sensor (e.g., a two dimensional LiDAR or laser scanner). This two dimensional depth sensor may determine vertical abnormalities along a line (e.g., a one dimensional space with length, as opposed to an area with length and a width) across the surface. The two dimensional depth sensor may contrast with other embodiments that utilize a one dimensional depth sensor that may determine a vertical obstacle at a point on a surface (e.g., a point at a relative position away from the depth sensor over time) or yet other embodiments that utilizes a three dimensional depth sensor that may determine a vertical obstacle across an area of a surface (e.g., a two dimensional area with length and width, as opposed to a space with only a length). Advantageously, the variation in depth along a horizontal line (e.g., a one dimensional space) in front of the automated sensor vehicle and across a surface that the automated sensor vehicle is traversing may be more detectible (e.g., produce more pronounced and differentiable sensor data) and require less processing than variations in depth across an area (e.g., a two dimensional area) in front of the automated sensor vehicle and across a surface that the automated sensor vehicle is traversing.

Figure 6:
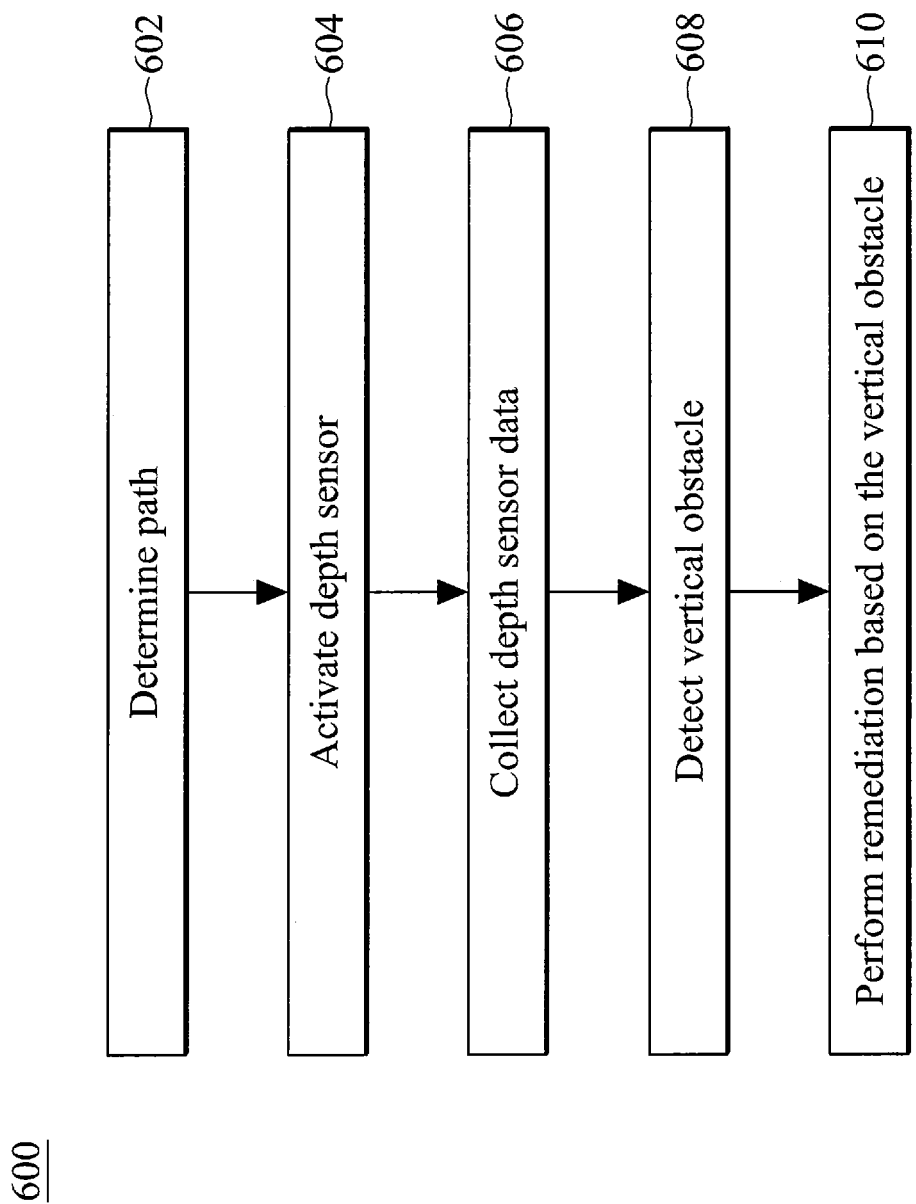
FIG. 6 is a flow chart of an automated sensor vehicle process, in accordance with some embodiments.

FIG. 6 is a flow chart of an automated sensor vehicle process 600, in accordance with some embodiments. The automated wafer handling process may be performed by at least one automated sensor vehicle. It is noted that the process 600 is merely an example, and is not intended to limit the present disclosure. Accordingly, it is understood that additional operations may be provided before, during, and after the process 600 of FIG. 6, certain operations may be omitted, certain operations may be performed concurrently with other operations, and that some other operations may only be briefly described herein.

At operation 602, an automated sensor vehicle may determine a path to traverse over a raised floorboard platform. For example, the automated sensor vehicle may be configured to traverse the raised floorboard platform along a predetermined route. The predetermined route may be, for example, between two different wafer stores (e.g., semiconductor processing stations, tools) for stationary storage, processing, or holding of a wafer). For example, the wafer store may be a platform for passive storage of a wafer, such as a rack, shelf, or a table top on which a wafer carrier may be placed. Alternatively, the wafer store may be a platform for active storage of a wafer, such as a semiconductor processing station, tool or stocker. When the wafer store is a semiconductor processing station or tool, the wafer store may specifically be part of the semiconductor processing station or tool that is the load port where the semiconductor processing station or tool is configured to receive or eject the wafer carrier and the constituent wafers or dies processed by the semiconductor processing station or tool.

Accordingly, the automated sensor vehicle may ferry semiconductor workpieces from one semiconductor processing station to another semiconductor processing station via a predetermined path across the raised floorboard platform. In particular embodiments, the automated sensor vehicle is configured to move across the raised floorboard platform at about 0.8 meters per second or from about 0.5 meters per second to about 1 meters per second. The raised floorboard platform may be porous and/or at a set distance above an underlying floor.

In certain embodiments, the automated sensor vehicle may be configured with a pathing module that may configure the automated sensor vehicle to determine various paths (e.g., determine various predetermined paths, or paths determined prior to setting out between locations) between different wafer handling areas autonomously and without external, manual guidance (e.g., without being driven and/or guided manually by an operator in real time). For example, pathing modules may be configured to receive and execute movement along known paths between different wafer handling areas. As another example, pathing modules may autonomously analyze a semiconductor fabrication facility (e.g., a layout of the semiconductor fabrication facility) to determine different paths between different wafer handling areas to avoid stationary obstacles. Further examples of pathing modules may include modules which may execute pathing or path finding applications, such as an application of Dijkstra's algorithm or an angle path planning algorithm.

At operation 604, a depth sensor may be activated. As noted above, an automated sensor vehicle may be an automated guided vehicle with at least one depth sensor. For example, the automated sensor vehicle may be configured to move in a forward direction such that the depth sensor may detect the vertical obstacle as a variation in depth along a horizontal line in front of the automated sensor vehicle and across the raised floorboard platform that the automated sensor vehicle is traversing.

In particular embodiments, the automated sensor vehicle may include multiple depth sensors but only utilize (e.g., have activated) one of the multiple depth sensors at a time. For example, only a depth sensor facing a forward direction of motion may be utilized or activated while the automated sensor vehicle is moving in the forward direction of motion. However, when the automated sensor vehicle is backing up (e.g., moving in a reverse direction of motion), only a depth sensor facing a reverse direction of motion may be utilized or activated. Stated another way, the automated sensor vehicle may only utilize a depth sensor that may collect depth sensor data characterizing a region ahead of where the automated sensor vehicle moves. In alternative embodiments, the automated sensor vehicle may move in a particular direction but have multiple s depth sensors active (e.g., be monitoring all two dimensional fields of view from all depth sensors or from multiple depth sensors).

At operation 606, depth sensor data may be collected using an activated depth sensor. In certain embodiments, the depth sensor may be a laser sensor. More specifically, the depth sensor may be, for example, a light detection and ranging (LiDAR) sensor or other laser scanner, which is configured to illuminate a target or surface (e.g., a ground or a platform of raised floorboards) with a pulsed laser light and to measure the reflected pulses. Differences between the returned reflected pulses and outbound illuminating pulses in terms of the return times and wavelengths may be utilized to determine a distance from a surface. These distances (and/or the differences from which the distances are inferred) may be referred to as depth sensor data.

In certain embodiments, this depth sensor data may be collected along a one dimensional horizontal line across a surface (e.g., the raised floorboard platform). Collection of this depth sensor data along this one dimensional horizontal line may be via a two dimensional depth sensor (e.g., a two dimensional LiDAR or laser scanner) with a two dimensional field of view. Accordingly, the two dimensional field of view would terminate at the surface (e.g., the raised floorboard platform) and form the horizontal line should the surface (e.g., the raised floorboard platform) be vertically consistent (e.g., without a missing panel or other opening along the raised floorboard platform).

At operation 608, a vertical obstacle may be detected based on the depth sensor data. In certain embodiments, the vertical obstacle may be a step change in the depth sensor data across the one dimensional horizontal line that is greater than a threshold amount (e.g., a threshold amount that expresses occurrence of an outlier or a non-nominal difference in depth sensor data across the one dimensional horizontal line). In certain embodiments, the vertical obstacle may be detected when a difference in the depth sensor data across the one dimensional horizontal line is greater than about 1 centimeters (cm), greater than about 10 cm, greater than about 20 cm, greater than about 30 cm, greater than about 40 cm, greater than about 50 cm, or greater than about 60 cm. Accordingly, the depth sensor may be configured to determine the vertical obstacle along the one dimensional horizontal line across the surface (e.g., the raised floorboard platform) based on the depth sensor data.

As noted above, the detection or collection of this depth sensor data along this one dimensional horizontal line may be via a two dimensional depth sensor (e.g., a two dimensional LiDAR or laser scanner) with a two dimensional field of view. Accordingly, the two dimensional field of view would terminate at the surface (e.g., the raised floorboard platform) and form the horizontal line should the surface (e.g., the raised floorboard platform) be vertically consistent (e.g., without a missing panel or other opening along the raised floorboard platform).

However, depth sensor data from the two dimensional field of view would be indicative of a vertical inconstancy along the horizontal line should the surface (e.g., the raised floorboard platform) be vertically inconsistent (e.g., with a missing panel or other opening along the raised floorboard platform). Advantageously, the variation in depth along the horizontal line (e.g., a one dimensional area) in front of the automated sensor vehicle and across a surface that the automated sensor vehicle is traversing (e.g., the raised floorboards) may be more detectible (e.g., produce more pronounced and differentiable sensor data) and require less processing than variations in depth across an area (e.g., a two dimensional area) in front of the automated sensor vehicle and across the surface (e.g., the raised floorboards that the automated sensor vehicle is traversing).

At operation 610, remediation may be performed in response to the detection of the vertical obstacle. This remediation may include the automated sensor vehicle redirecting its path across the raised floorboard platform to avoid the detected vertical obstacle. In particular embodiments, this redirected path may have the same start and end points as the original path but be designed to avoid the detected vertical obstacle.

In further embodiments, this remediation may be an immediate stop of the automated sensor vehicle in response to the vertical obstacle detected ahead of the automated sensor vehicle (e.g., ahead of the automated sensor vehicle along a direction that the automated sensor vehicle is moving). This immediate stop may trigger a pathing module of the automated sensor vehicle to analyze an updated layout of the semiconductor fabrication facility (e.g., now with the newly detected vertical obstacle). Once analyzed, the pathing module may provide the redirected (e.g., new) path for the automated sensor vehicle to traverse the raised floorboard platform.

In other embodiments, this immediate stop may trigger an instruction (e.g., an alert or communication via a communication interface) for an operator of the semiconductor fabrication facility with the raised floorboard platform that the automated sensor vehicle is traversing to remediate the vertical obstacle (e.g., replace the missing floorboard piece and/or remove the unexpected item on top of the raised floorboard platform). Once the vertical obstacle is remediated, then the automated sensor vehicle may be instructed (e.g., via the communication interface) by the alerted operator to resume its original path across the semiconductor fabrication facility. In certain embodiments, the instruction may be a notification sent via the communication interface to the automated sensor vehicle that the vertical obstacle is remediated.

In an embodiment a system includes: an automated vehicle configured to traverse a first predetermined path; and a sensor system located on the automated vehicle, the sensor system configured to detect a vertical obstacle along the first predetermined path along one or two floorboards ahead of the automated vehicle, wherein the automated vehicle is configured to traverse a second predetermined path in response to detecting the vertical obstacle.

In another embodiment, a system includes: a raised floorboard platform configured to reduce vibrations from one side of the raised floorboard platform from passing through to a second side of the raised floorboard platform; an automated vehicle configured to traverse the raised floorboard platform along a first predetermined path; and a sensor system configured to detect a vertical obstacle along the first predetermined path along a floorboard ahead of the automated vehicle, wherein the automated vehicle is configured to traverse the raised floorboard platform along a second predetermined path in response to detecting the vertical obstacle.

In another embodiment, a method includes: collecting depth sensor data along a line ahead of an automated vehicle as the automated vehicle moves along a first predetermined path; detecting a vertical obstacle ahead of the automated vehicle based on the depth sensor data; and redirecting the automated vehicle to move along a second predetermined path in response to the detecting the vertical obstacle.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system, comprising:
an automated vehicle configured to traverse a first predetermined path on a raised floorboard; and
a sensor system located on the automated vehicle, the sensor system configured to detect a variation in depth along the first predetermined path on the raised floorboard along one or two floorboards ahead of the automated vehicle, wherein the automated vehicle is configured to traverse a second predetermined path in response to detecting the variation in depth,
wherein the sensor system is configured to determine the variation in depth along a one-dimensional horizontal line across the one or two floorboards ahead of the automated vehicle.

2. The system of claim 1, wherein the sensor system comprises a two dimensional light detection and ranging (LiDAR) sensor.

3. The system of claim 1, wherein the variation in depth is caused by an opening in the raised floorboard.

4. The system of claim 1, wherein the sensor system comprises a two dimensional light detection and ranging (LiDAR) sensor implemented with a linear laser.

5. The system of claim 1, wherein the sensor system comprises multiple two dimensional light detection and ranging (LiDAR) sensors configured to detect vertical inconsistencies along respective lines orthogonal to each other.

6. The system of claim 1, wherein one of the respective lines extends along an axis orthogonal to a direction of motion of the automated vehicle.

7. A system, comprising:
a raised floorboard platform configured to reduce vibrations from one side of the raised floorboard platform from passing through to a second side of the raised floorboard platform;
an automated vehicle configured to traverse the raised floorboard platform along a first predetermined path; and
a sensor system configured to detect a variation in depth along the first predetermined path along a floorboard ahead of the automated vehicle, wherein the automated vehicle is configured to traverse the raised floorboard platform along a second predetermined path in response to detecting the variation in depth,
wherein the sensor system is configured to determine the variation in depth along a one-dimensional horizontal line across the raised floorboard ahead of the automated vehicle.

8. The system of claim 7, wherein the sensor system comprises a linear laser that is tilted at an angle of about 30 degrees to about 50 degrees from a surface of the automated vehicle.

9. The system of claim 8, wherein the linear laser is about 100 millimeters to about 1000 millimeters above the raised floorboard platform.

10. The system of claim 7, wherein the automated vehicle is configured to move across the raised floorboard platform at about 0.5 to about 1 meters per second.

11. The system of claim 7, wherein the sensor system comprises a sensor part and a processor part, wherein the sensor part is configured to produce sensor data that is processed by the processor part to detect the vertical obstacle along the first predetermined path.

12. The system of claim 7, wherein the variation in depth is caused by an opening in the raised floorboard.

13. The system of claim 7, wherein the raised floorboard platform are porous.

14. The system of claim 7, wherein a robotic arm is located on top of the automated vehicle.

15. A method, comprising:
collecting depth sensor data along a line ahead of an automated vehicle as the automated vehicle moves along a first predetermined path on a raised floorboard;

detecting a variation in depth in a surface of the first predetermined path on the raised floorboard ahead of the automated vehicle based on the depth sensor data; and redirecting the automated vehicle to move along a second predetermined path in response to the detecting the variation in depth, wherein the sensor system is configured to determine the variation in depth along a one-dimensional horizontal line across the surface of the first predetermined path ahead of the automated vehicle.

16. The method of claim 15, further comprising:
stopping the automated vehicle in response to the detecting the variation in depth.

17. The method of claim 15, wherein the variation in depth is caused by an opening in the raised floorboard.

18. The method of claim 17, wherein the second predetermined path is from the first semiconductor processing station to the second semiconductor processing station along the raised floorboard platform, wherein the second predetermined path is different than the first predetermined path.

19. The method of claim 15, further comprising:
moving a semiconductor workpiece between a first semiconductor processing station and a second semiconductor processing station, wherein the first predetermined path and the second predetermined path are between the first semiconductor processing station and the second semiconductor processing station.

20. The method of claim 19, further comprising:
moving, via a robotic arm on the automated vehicle, the semiconductor workpiece from the automated vehicle to the second semiconductor processing station.

* * * * *